Patented Oct. 7, 1930

1,777,570

UNITED STATES PATENT OFFICE

JACOB S. MASIN, OF ANNISTON, ALABAMA, ASSIGNOR, BY MESNE ASSIGNMENTS, TO SWANN RESEARCH, INC., OF BIRMINGHAM, ALABAMA, A CORPORATION OF ALABAMA

PROCESS FOR THE PURIFICATION OF ALUMINOUS OXIDE

No Drawing.   Application filed June 1, 1925. Serial No. 34,179.

My invention relates to a process for the purification of material which is very resistant to the chemical action of most chemicals at atmospheric temperature. More specifically, I refer to the treatment of artificial fused aluminous oxide and natural corundum with mixtures of hydrofluoric and hydrochloric acid or hydrofluoric and sulphuric acid.

The object of my invention is the purification of these materials and the making of a product of a higher quality. As a result of this purification, the surface of the grain will have a greater adhesive affinity for bonds when used for the manufacture of grinding wheels, refractory articles, abrasive papers or similar articles. In the case of fused aluminous oxide it is possible to substantially remove the impurities and thereby increase the aluminum oxide content.

I have found this process applicable and particularly adapted to the treatment of the above materials after they are crushed and graded to the desired size grains.

Fused aluminous oxide, of the quality referred to, is made by electric furnace smelting of bauxite with coke and iron borings or turnings. A typical analysis of this material will be:

|  | Per cent |
| --- | --- |
| Alumina | 95.4 |
| Silica | 1.8 |
| Iron oxide | .3 |
| Titanium oxide | 2.5 |

For certain classes of work, it is desirable to have a higher grade abrasive material than indicated by the above analysis. This higher grade may be obtained by furnacing pure amorphous alumina, fusing natural corundum, refusing or otherwise treating the material of the above analysis. By the treatment according to my process, I am able to treat the crushed grain in such a manner that the impurities are greatly reduced.

While I do not commit myself to any special theory, in explanation of what takes place, it is my observation that the grain are composed of several full size crystals, or parts of crystals, of fused alumina bound together by a different substance and the acid treatment removes all or part of this substance which is more readily dissolved by the acids than the aluminous oxide crystal. These crystals form during the period of cooling of the fused alumina. While the impurities are a small percentage, these are concentrated in the molten mass as the crystals form. When crushing takes place, some of the crystals are broken and when examined under a microscope the line of crystal faces may be clearly seen with a substance separating the crystals. When the grain is subjected to the action of a mixture of hydrofluoric and hydrochloric acid or hydrofluoric and sulphuric acid the impurities between the crystal faces are found to be dissolved, and higher purity aluminous oxide results. Other acids, as for instance nitric acid, may be used, but for economic reasons, are not preferred. If some grain be studied under a microscope and then treated as above described and then examined again it will be observed that where there were lines between the crystal faces, before treatment, there is an etching out of a large portion of this line. A comparison of a typical analysis of grain before treatment and after treatment is:

|  | Before | After |
| --- | --- | --- |
| Alumina | 94.78 | 97.99 |
| Silica | 1.70 | .40 |
| Iron oxide | .43 | .19 |
| Titanium oxide | 2.90 | 1.30 |

In addition to dissolving some of the substance between the crystals, some adhering minute particles are detached from the abrasive grain and may be separated by screening. A typical analysis of these solid particles which are detached during treatment is as follows:

|  | Per cent |
| --- | --- |
| Alumina | 78.82 |
| Silica | 2.94 |
| Iron oxide | 0.55 |
| Titanium oxide | 17.60 |
| Carbon | .09 |

This treatment may also be applied by the use of hydrofluoric acid gas when passed over the surfaces of the grain while they are moistened with sulphuric or hydrochloric acid.

The use of fluorides is another means of supplying hydrofluoric acid; and these fluorides may be mixed with the grain before treated, so the hydrofluoric acid will be liberated by the action of the other acid used, as for instance sulphuric acid.

I will now describe an illustrative manner in which I carry out the proposed treatment of abrasive grains according to my present process. A lot of 1000 pounds of graded abrasive is treated in a lead vat, as a suitable container, with a mixture containing approximately 6% hydrofluoric and 16% sulphuric acid. The grain is covered with the mixed acid and allowed to stand about twenty-four hours, after which the acid is drained off, the grain washed free of acid, dried, and the fine detached particles screened out. The application of heat will aid the reaction of the acids on the grain, but its use has not been found necessary. The discard acid can be used over and over again. If preferred, for economical or commercial reasons, hydrofluoric acid may be used to replace sulphuric acid, in which event 20% hydrofluoric acid is used, and wood vats should be substituted for lead vats, but I regard hydrochloric and sulphuric acid as full equivalents in the practice of my process.

In the furnacing of aluminous oxide, the iron which is added combines with the silicon from the bauxite and forms ferro-silicon, which normally sinks to the bottom of the block of fused alumina; however, in some cases a portion of ferro-silicon remains suspended and is found in the crushed material. This ferro-silicon in the material is removed by means of magnetic separators of high intensity. The alumina from which the magnetic ferro-silicon has been removed is that which I prefer to treat by the present process, as it reduces the amount of acids necessary for the treatment, i. e., the silicon can be removed more cheaply by magnetic than by chemical means.

Having thus described my invention, what I claim as new and desire to secure by Letters Patent, is:—

1. The process of producing crystalline aluminous oxide abrasives from bauxite which consists in smelting bauxite with carbon to form crystalline alumina with an acid soluble matrix surrounding the crystals, grinding the smelted material to form finely divided crystalline alumina, and treating said crystalline alumina with a mixture of hydrofluoric acid and a strong mineral acid.

2. The process of producing crystalline aluminous oxide abrasives from bauxite which consists in smelting bauxite with carbon to form crystalline alumina with an acid soluble matrix surrounding the crystals, grinding the smelted material to form finely divided crystalline alumina, and treating said crystalline alumina with a mixture of hydrofluoric and sulphuric acids.

3. The process of producing crystalline aluminous oxide abrasives from bauxite which consists in smelting bauxite with carbon to form crystalline alumina with an acid soluble matrix surrounding the crystals, grinding the smelted material to form finely divided crystalline alumina, and subjecting said crystals to the action of an acid bath comprising 6% HF and 16% $H_2SO_4$.

4. The process of producing crystalline aluminous oxide abrasives from bauxite which consists in smelting bauxite with carbon and iron to form crystalline alumina with an acid soluble matrix surrounding the crystals, crushing the material to the desired size, subjecting the crushed material to a magnetic field of high intensity to remove metallic impurities, and subjecting the resultant material to the action of a bath of hydrofluoric and sulphuric acids to remove the matrix.

5. The process of producing crystalline aluminous oxide abrasives from bauxite which consists in smelting bauxite with carbon and iron to form crystalline alumina with an acid soluble matrix surrounding the crystals, crushing the material to the desired size, subjecting the crushed material to a magnetic field of high intensity to remove metallic impurities, subjecting the resultant material to the action of a bath of hydrofluoric and sulphuric acids to remove the matrix, washing the material to remove the acids, and then drying the material.

6. Process of purifying alumina obtained from fused aluminous material by reduction of associated oxide impurities and separation thereof from the alumina, comprising changing the molten alumina into a solid form in which more or less of such impurities are accessible to chemical action, and then without further purifying treatment at high temperature removing a substantial part of such impurities by leaching with an acid reagent.

In testimony whereof I affix my signature.

JACOB S. MASIN.